May 6, 1969 F. A. BRAWNER ET AL 3,442,150
REMOTE CONTROL APPARATUS
Filed June 29, 1966
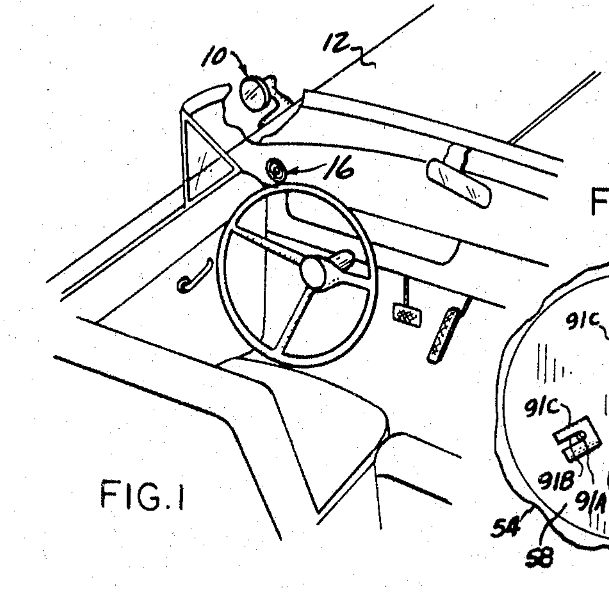
FIG. 1
FIG. 6
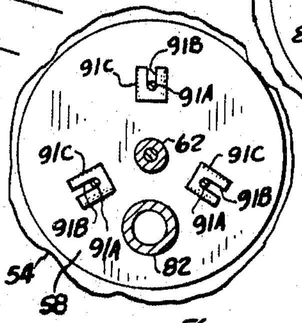
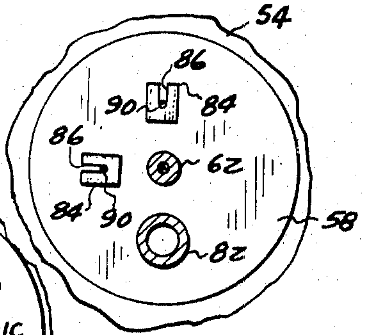
FIG. 4
FIG. 3
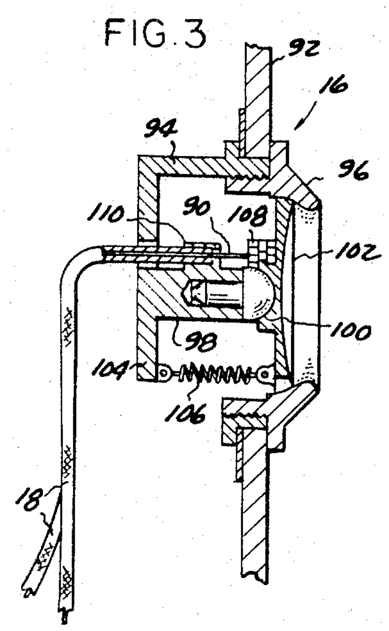
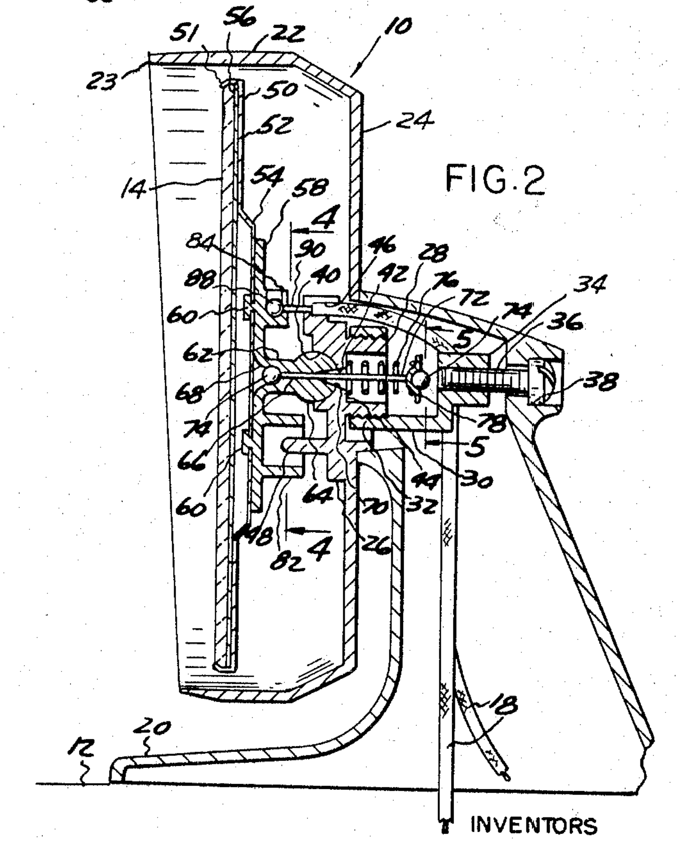
FIG. 2
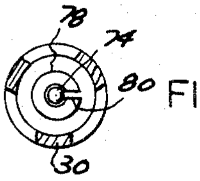
FIG. 5
INVENTORS
FREDERICK A. BRAWNER
LAWRENCE SMITH
BY *Naucke, Kreas, & Gifford*
ATTORNEYS United States Patent Office 3,442,150

Patented May 6, 1969

3,442,150

REMOTE CONTROL APPARATUS

Frederick A. Brawner, Detroit, and Lawrence H. Smith, Bloomfield Hills, Mich., assignors to Lee Radke Associates, Inc., Detroit, Mich., a corporation of Michigan Filed June 29, 1966, Ser. No. 561,467

Int. Cl. B60r *1/06*

U.S. Cl. 74—501 13 Claims

ABSTRACT OF THE DISCLOSURE

A remote control mirror apparatus for an exteriorly positioned automotive rear view mirror wherein the mirror is adjustable about a pivotal support by means of a depressed pivotal button mounted in the interior of the vehicle.

This invention relates to a remote control device and more specifically to a positional control apparatus for an automotive rear view mirror from the operator of the vehicle.

Automotive rear view mirrors of the type mounted on the fender of the vehicle or the exterior surface of a vehicle door have become practically universally accepted. Because these mirrors are normally for purposes of visibility inconveniently positioned for manual adjustment by the operator of the vehicle in his driving compartment, many attempts have been made to provide an apparatus for remotely adjusting the mirror element for optimum visibility. It is normally desirable to adjust the mirror element to conform to the different physical characteristics and preferences of the operators. Furthermore, sudden shocks or jolts due to irregularities in the road surface tend to overcome the inherent stability of the mirror element and jar the element out of adjustment. It is extremely desirable that the operator can re-adjust the mirror element without having to lower the window to extend his hand outside of the vehicle to manipulate the mirror element which can be unsafe under expressway driving conditions and uncomfortable during inclement weather.

Various approaches have been made in the past to provide apparatus for remotely controlling the position of a rear view mirror fixed to an exterior section of the automobile such as the left front fender. Efforts to achieve remote adjustability in the prior art have included using various kinds of remote control mechanism such as gearing, which has proven to be commercially expensive.

Another approach to achieve this objective has been to utilize a plurality of cables which are connected to a mirror holding element at one end and to an operator control element at their opposite end. Normally, the operator manipulates the control element, and the motion of the control element is transmitted through the cables to the mirror holding element. The utilization of cables to transmit the motion of the operator control member to the mirror holding member has been popular. However, although the mirror element can be readily adjusted, problems have arisen with respect to the stability of the mirror; that is, the ability of the mirror to maintain its position under varying environmental forces such as vibrations of the vehicle due to road conditions, wind forces and the like.

Another major drawback in conventional remote control apparatus lies in the configuration of the operator control member, which normally takes the form of an actuating post which extends from the surface of an interior section of the vehicle, such as the dashboard. The operator of the vehicle normally manually grips this actuating post and by manipulating the post, achieves the desired positional alignment of the mirror element. However, numerous studies made in recent years regarding the cause of injuries to the occupants of vehicles involved in accidents wherein the vehicle experiences a sudden sharp deceleration in its forward rate of travel, indicates that many injuries are caused by a sudden change in their relative position within the vehicle, causing the occupants to come into contact with various projecting members disposed within the interior of the vehicle. Projecting members of this character include various functional members such as gear shift levers, interiorly mounted rearview mirrors, actuating handles and knobs and the like.

It is therefore an object of the invention to provide an actuating member which does not extend into the compartment of the vehicle to present a potential injury-producing object to the occupants of the vehicle. This objective is achieved by providing an apparatus wherein the actuating member comprises a button disposed within a recessed housing which is mounted substantially flush with respect to the surrounding structure.

Another major problem inherent with conventional control apparatus for remotely positioned rearview mirrors lies in their assembly with the vehicle in the automotive assembly plant. Normally the ends of the operating cables associated with the mirror housing are joined to the housing in a sub-assembly operation at the time the mirror is combined with the housing. The housing normally has a somewhat dished configuration provided with an aperture associated with each of the cables. The cables are threaded through the apertures and provided with an enlarged end disposed within the housing. The periphery of the housing is then flanged to retain the mirror element and a felt backing member.

The problems with this type of construction are twofold: (1) The apertures in the housing to accommodate the cable ends provide a source of water leakage into the housing and behind the mirror which contributes to the deterioration of the mirror element; and (2) the combination of the mirror member and the cables is difficult to assemble in the frame of the automotive vehicle since there is a hazard of shattering the mirror as the attached cables are threaded through the various openings in the vehicle from the fender section to the operator control member in the occupant compartment.

The structure of the remote control apparatus illustrating the preferred embodiment of the present invention obviates the problems of assembly encountered in conventional control apparatus. This improved result is achieved by providing a mirror housing in which the ends of the cables are connected with an open-ended slot provided on the back surface of the mirror housing and which runs transversely to the direction of the cable. Each cable is provided with an enlarged end which readily slips into and out of the slot.

By eliminating the apertures in which the operating cables are normally attached to the mirror housing, the water proof integrity of the housing is maintained, thus increasing the effective life of the mirror element. Furthermore by providing a releasable connection between the cable ends and the mirror housing, the cables can first be separately threaded in the vehicle body and then their ends connected to the mirror housing, thus assuring a quicker operation and precluding the hazard of the mirror element being damaged in the assembly operation.

The assembly operation is further improved by providing that the apparatus preferably requires only two cables as compared with three or four in conventional control apparatus. Furthermore the cables of the present invention are of equal length thus reducing the manufacturing cost inherent in conventional control cables wherein the cables are of dissimilar lengths.

The control apparatus illustrating the present invention also provides for a readily adjustable mirror element which is responsive to manipulation of the control cables and wherein the stability of the mirror element is not solely dependent on the control cables. This improved stability of the present invention is achieved by providing a mirror housing with a rearwardly extending member having a substantially hemispherically curved enlarged end. This enlarged end is seated in a hemispherically shaped socket member provided in a body element. The mirror is mounted for universal movement with respect to the body element by mating their respective hemispherically shaped surfaces and joining the two members by a flexible link, one end of which is connected to the enlarged end of the mirror. The opposite end of the flexible connecting link extends through an aperture provided in the socket and is operatively connected with a spring member which urges the end away from the mirror element, thus assuring that the mating hemispherically formed supporting surfaces are in all positions snugly joined to one another. The flexible connecting member assures that the mirror member is stable in all positions and under all operating conditions.

It is therefore an object of the present invention to improve the operating cables of remotely controlled mirrors within the automotive body by providing a releasable connection between the ends of the cables and the mirror housing so that the cables may be first assembled within the body and then connected to the mirror housing.

It is another object of the present invention to increase the life of exteriorly mounted remotely controlled automotive rear view mirrors by providing a mirror of this type in which the operating cables are joined to a connection formed on the exterior of the housing thereby eliminating the requirement for apertures in the mirror housing associated with the cables through which water or other foreign matter enter.

It is a further object of the present invention to improve the stability of exteriorly mounted remotely operated rear view mirrors by providing a mirror housing having a ball member extending away from the body of the housing and which fits in a socket member mounted on the vehicle and including a flexible connecting member urging the ball and socket member toward one another and having one end connected to the ball and the opposite end extending through an aperture in the socket to cooperate with a spring member to snugly fit the ball in the socket in all relative positions between the mirror housing and the socket member.

Still further objects and advantages of the present invention will readily occur to one skilled in the art to which the invention pertains upon reference to the following detailed description which makes reference to the accompanying drawings in which like reference characters refer to like parts throughout the several views and in which:

FIG. 1 is a perspective view illustrating a remotely controllable rear view mirror embodying the present invention mounted on the left front fender of an automotive vehicle and controlled by an operator control member mounted on the dashboard of the vehicle.

FIG. 2 is an elevational cross sectional view taken through the mirror illustrated in FIG. 1;

FIG. 3 is a sectional view taken through the control member illustrated in FIG. 1;

FIG. 4 is a sectional view taken along line 4—4 of FIG. 2;

FIG. 5 is a sectional view taken along line 5—5 of FIG. 2; and

FIG. 6 is a view similar to FIG. 4, but illustrating another preferred embodiment of the present invention.

Now referring to the drawings, a mirror assembly generally indicated at 10 is shown as mounted on the left front fender of an automotive vehicle 12. The mirror assembly 10 includes a mirror element 14, facing rearwardly to provide a view for the operator of the vehicle of conditions to the side and rear of the vehicle 12. The mirror element 14 is adjusted for alignment in response to a manipulated movement by the vehicle operator on the control assembly 16 preferably mounted on the dashboard of the vehicle 12 and which movement is transmitted through a pair of control cables 18 to the mirror element 14.

Referring to FIG. 2, the mirror assembly 10 includes a hollow riser member 20 which supports a mirror housing 22 to a convenient supporting section of the automotive vehicle 12 such as the left front fender.

The housing 22 has a generally circular, dished configuration and has an open end 23 and a back wall section 24 provided with a centrally located mirror supporting section or base 26. An annular exteriorly threaded section 28 is formed in the supporting section 26 on the side opposite the open end 23 of the housing 22 which is engaged to a hollow collar member 30 having an interiorly threaded section 32 engaged with the threaded section 28. The collar member 30 has a nut section 34 at the opposite end from the threaded section 32 and spaced therefrom which engages with a bolt member 36. The bolt member 36 has a head section which is seated in a counter sunk bore 38 provided in the riser member 20 and which when tightened securely seats the back wall 24 of the housing 22 to the riser 20.

A substantially hemispherically shaped, concavely formed section 40 is axially formed in the supporting section 26 on the side opposite the threaded section 28 and has an axially tapered bore 42 defined therein which extends rearwardly to the annular extension 28 to form an annular shoulder 44. A pair of counterbored apertures 46, only one of which is illustrated, are radially spaced from the axis of the supporting section 26 and preferably angularly spaced at about 90°. A finger member 48 is also radially spaced from the axis of the supporting section 26 preferably approximately the same radial distance as the apertures 46, and extends normally and forwardly from the back wall section 24.

Now still referring to FIG. 2, the mirror element 14, for purposes of description, is illustrated as being circular in configuration and is carried in a circular housing 50 having a peripheral normally extending flange 51 which tightly fits the circumference of the mirror element 14. The housing 50 has a back section 52 which is connected to an axial dished section 54. Preferably an asphalt impregnated backing element 56 is tightly contained between the back section 52 of the housing and the mirror element 14.

A circular shaped, pivot plate 58 is fixed to the back of the dished section 54 preferably by a plurality of projections 60 which are carried by the pivot plate 58 and extend through apertures provided in the dished section 54. The projections 60 are preferably staked in place to provide a water-tight rigid attachment. The pivot plate 58 has a rearwardly extending supporting member or supporting member 62 which has at its free end a substantially hemispherically formed convexly shaped surface 64 which corresponds to the concavely formed surface 40.

A slot 66 is formed in the supporting member 62 and terminates at its inner end with a cavity 68 and at its outer end with a tapered bore 70. The convex surface 64 is normally seated in the concavely formed surface 40 so that the outer end of the tapered bore 70 registers with the bore 42 provided in the supporting section 26.

To maintain the hemispherically formed supporting surfaces in their mated condition, a flexible, elongated connector member 72 having enlarged ends 74 has one of its ends seated in the cavity 68, its intermediate elongated section seated in the slot 66 and extending through the tapered bore 42 a distance sufficiently rearward of the bore 42 to accommodate a coil spring member 76. The spring 76 has one end seated against the annular shoulder 44 and its opposite end urging against an annular retaining ring 78. As can be seen in FIG. 5, the retaining ring 78 is provided with an aperture to accommodate the body of the flexible connector 72. A slot 80 extends inwardly from the periphery of the retaining ring 78 to permit the enlarged end 74 of the flexible connector 72 to be slipped therein.

Referring back to FIG. 2, it can be seen that the spring 76 urges the flexible connector 72 into an extended position so that it imposes a force sufficient to retain the convexly formed supporting surface 64 of the mirror in all positions tightly against the concavely supporting surface 40 of the supporting section 26. The spring member 76 has a stiffness sufficient to stabilize the mirror element 14 under extreme operating conditions experienced by the vehicle 12.

Still referring to FIG. 2, the pivot plate 58 carries a cylindrical stop member 82 radially spaced from the axis of the supporting section at a distance corresponding to the finger 48 so that it surrounds the finger 48.

Now as can best be seen in FIGS. 2 and 4, the pivot plate 58 also carries a pair of angularly spaced projections 84 each of which has an open-ended slot 86 which receives the enlarged end 88 of a cable core 90. The slots 86 are formed generally transversely to the direction of the cables 18 and seat the enlarged ends of the cable cores 90 at an equal radial distance from the axis of the supporting member 62 and are formed at right angles with respect to the center of the supporting member 62.

It can thus be seen that the cylindrical stop member 82 cooperates with the finger 48 to eliminate the possibility of the mirror housing 50 being rotated about its axis to a point where the enlarged ends 88 of the cable cores 90 can slip out of their respective slots.

An alternate embodiment of the invention is illustrated in FIG. 6 wherein the movement of the control assembly 16 is transmitted through three control cables 18 to the mirror element 14. Each of the control cables has a cable core 91A with an enlarged end which is retained in an outwardly facing open-ended slot 91B formed in hollow projections 91C. The three projections 91C are equiradially spaced, as illustrated, about the supporting member 62. Preferably the slots 91B are equiangularly spaced about the supporting member 62 so that the control cables cooperate in response to a manipulation of the control assembly 16 to adjust the position of the minor element 14.

Still referring to FIG. 2, it can be seen that the control cables 18 terminates short of their enlarged ends 88 and are seated in the counterbores 46 provided in the supporting section 26. Thus the cables 18 normally are fixed with respect to the supporting section 26 so that their respective cable cores 90 move in response to a manipulative movement applied to the control assembly 16. Furthermore, since the cable cores 90 are connected to the housing 50 at right angles to another, they are able to move the housing into various selective positions according to the desires of the operator.

Now referring to FIG. 3, the control assembly or second member 16 is preferably mounted to a dashboard section 92 and includes a cylindrical housing section 94 and a retainer ring 96 which are threadingly joined to one another from opposite sides of the dashboard section 92. The cylindrical housing section 94 has an internal axial member 98 which carries a hemispherically shaped pivot member 100. An operator button member 102 is seated in the retainer ring 96 and has a hemispherically shaped supporting section which corresponds to the pivot member 100 and is supported thereon for universal movement. The button member 102 is connected to the rear wall of the housing 94 by three equiangularly spaced spring members 106, only one of which is illustrated. The spring members 106 serve to maintain the position of the button member in response to a force imposed thereon by the vehicle operator. In order to assist the vehicle operator in moving the button 102 into a desired position, the pivot member 100 is preferably formed of a low friction material, such as "Teflon."

A pair of projections 108 having open-ended slots are provided on the rear surface of button member 102 to receive the enlarged ends of the cable cores 90. The member 98 includes a pair of projections 110 provided with an axial counterbore to seat the ends of control cables 18.

It can be seen that the projections 108 which provide connections for the ends of the cable core 90 and are associated with a button 102 are radially spaced from the axis of button 102 a distance which is at least one-half of the distance of the connection between the cable cores 90 and the axis of the mirror pivot plate 58, thus providing that a manipulative movement of the operator button 102 will be substantially reduced when transmitted to the mirror 14, thus ensuring sensitive alignment of the mirror in response to the movement of the button 102.

It is to be understood that we have described in detail a mirror 14 which is positioned in response to a manipulative movement by an operator control button 102 and which movement is transmitted through cables which are releasably connected to both the mirror pivot plate and the button 102, thus permitting the cables to be separately assembled with the vehicle and then the mirror assembly 10 connected to one end of the cables and the control assembly 16 connected to the opposite end of the cables. It can further be seen that the mirror housing 50 in the preferred embodiment of the invention provides a waterproof casing for the mirror element 14 which is achieved through the improved releasable connection. It can further be seen that we have described an operator member 102 which is recessed within its housing 94 so that it is substantially flush with the surrounding supporting surface, thus eliminating the possibility of an injury producing hazard to an occupant of the vehicle in the event of a sudden deceleration of the vehicle.

It is to be understood that although we have described but two preferred embodiments of the invention, that various changes and modifications may be made therein without departing from the spirit of the invention or the scope of the accompanying claims.

We claim:

1. Positional control apparatus for a remotely supported member useful in positioning an automotive rear view mirror spaced from the operator, comprising, (a) a base;
(b) a first member;
(c) said base having a partially spherical concavely curved supporting surface;
(d) said first member having a partially spherical convexly curved surface corresponding to said concavely curved surface;
(e) means supportably coupling said convexly curved surface to said concavely curved surface and permitting universal movement of said first member with respect to said base;
(f) a second member;
(g) a support for said member remote from said first member;
(h) means supporting said second member for universal movement about a pivot point associated with said support;
(i) at least two cables;
(j) a releasable connection between said members and said cables;

(k) means for mounting the mirror to said first member; and (l) said support defining a recess and said second member being entirely disposed within said recess and operative in response to a force imposed in a direction substantially axial with respect to said recess and toward said pivot point.

2. The invention as defined in claim 1, wherein said cables cause said first member to move in coacting relationship in response to movement of said second member.

3. Positional control apparatus for a remotely supported member useful in positioning an automotive rear view mirror spaced from the operator, comprising, (a) a base;
(b) a first member;
(c) said base having a partially spherical concavely curved supporting surface;
(d) said first member having a partially spherical convexly curved surface corresponding to said concavely curved surface;
(e) means supportably coupling said convexly curved surface to said concavely curved surface and permitting universal movement of said first member with respect to said base;
(f) a second member;
(g) a support for said second member remote from said first member;
(h) means supporting said second member for universal movement about a pivot point associated with said support;
(i) at least two cables;
(j) a releasable connection between said members and said cables;
(k) means for mounting the mirror to said first member; and
(l) said coupling means comprising:
 (1) said first member having a slot, said slot having a first extreme end terminating at said convexly curved surface, and a second opposite end terminating at a cavity defined within said first member,
 (2) said base having an aperture defined in said concavely curved surface and registering with the open end of said slot,
 (3) an elongated flexible connecting element disposed within said slot and having an enlarged end seated in said cavity and a second end extending through the aperture of said base, and
 (4) resilient means associated with the second end of said flexible connecting element and normally urging said second end in a direction away from said first member so that the convexly curved surface of said first member is snugly fitted within the concavely curved surface of said base.

4. Positional control apparatus for a remotely supported member useful in positioning an automotive rear view mirror spaced from the operator, said apparatus comprising:

(a) a base and means mounting said base to a vehicle or the like;
(b) a first member, a mirror mounted to said first member, and means for pivotally coupling said first member to said base;
(c) said coupling means comprising said base and said first member being provided with complementary, partially spherical surfaces and means urging said surfaces into engagement;
(d) a second member and a support for said second member disposed remotely from said first member, and means for supporting said second member for universal movement about a pivot point associated with said support;

(e) at least one cable connecting said first member to said second member to transmit pivotal movement of said second member to said mirror;
(f) said support defining a recess and said second member being disposed substantially entirely within said recess and being operable upon being manually pivoted to move said cable and thereby pivot said first member about said base.

5. The apparatus as defined in claim 4 and in which said last mentioned means comprises said second member and said support being provided with complementary partially spherical surfaces and means urging said surfaces into engagement.

6. The apparatus as defined in claim 4 wherein said last mentioned means comprises said second member having a partially spherical, concavely curved supporting surface, said support having a partially spherical convexly curved surface corresponding to said concavely curved surface and including resilient means operative to supportably urge said convexly curved surface against said concavely curved surface and permitting universal relative movement between said second member and said support.

7. The apparatus as defined in claim 4 and wherein the connection between said first member and said cable comprises:

(a) an enlargement fixed to the end of said cable;
(b) one of said members having an open-ended slot associated with said cable and opening substantially transversely to the direction of the associated cable and said slot defining an opening greater than the thickness of said cable but less than the thickness of said enlargement.

8. The apparatus as defined in claim 4 and including at least three cables, said second member having an open-ended slot corresponding to each of said cables and arranged in equiangular disposition about a common axis passing through said pivot point and each of said cables having an enlarged end adapted to be releasably secured in each of said slots so that said cables cooperate in positioning said second member about said pivot point.

9. The invention as defined in claim 4 and including means releasably connecting said cable and said members comprising:

(a) an enlargement fixed to a common end of each of said cables; and
(b) said one of said members having an open-ended slot associated with each of said cables and running substantially transversely to the direction of the associated cable, and said slots each defining an opening greater than the thickness of said cable, but less than the thickness of said enlargement.

10. The invention as defined in claim 4 wherein said second member has a partially spherical, concavely curved supporting surface, said supporting member has a partially spherical convexly curved surface corresponding to said concavely curved surface and including resilient means operative to supportably urge said second convexly curved surface against said concavely curved surface and permitting universal relative movement between said second member and said support.

11. The invention as defined in claim 10, wherein said resilient means include spring members connecting said second member to said supporting member in a spaced apart relationship to said releasable cable connection.

12. The invention as defined in claim 4, including at least three cables, said one of said members having an open-ended slot corresponding to each of said cables arranged in an equiangular disposition about a common axis passing through said pivot point, and each of said cables having an enlarged end adapted to be releasably secured in each of said slots so that said cables cooperate in positioning said one of said members about said pivot point.

13. The invention as defined in claim 12, wherein said one of said members is said first member.

References Cited

UNITED STATES PATENTS

| | | | |
|---|---|---|---|
| 1,570,888 | 1/1926 | Gray. | |
| 2,615,368 | 10/1952 | Bindley | 248—481 |
| 3,030,821 | 4/1962 | Jacobson | 74—501 |
| 3,046,840 | 7/1962 | Barcus | 74—501 |
| 3,046,841 | 7/1962 | Kawecki | 74—501 |
| 3,191,455 | 6/1965 | Fuqua et al. | 74—501 |
| 955,521 | 4/1910 | Lovejoy. | |
| 3,229,082 | 1/1966 | Barron. | |

FRED C. MATTERN, Jr., *Primary Examiner.*

C. F. GREEN, *Assistant Examiner.*

U.S. Cl. X.R.

248—481